(12) United States Patent
Wu et al.

(10) Patent No.: US 6,964,043 B2
(45) Date of Patent: Nov. 8, 2005

(54) METHOD, APPARATUS, AND SYSTEM TO OPTIMIZE FREQUENTLY EXECUTED CODE AND TO USE COMPILER TRANSFORMATION AND HARDWARE SUPPORT TO HANDLE INFREQUENTLY EXECUTED CODE

(75) Inventors: Youfeng Wu, Palo Alto, CA (US); Li-Ling Chen, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 10/017,669

(22) Filed: Oct. 30, 2001

(65) Prior Publication Data

US 2003/0101444 A1 May 29, 2003

(51) Int. Cl.[7] .................................................. G06F 9/45
(52) U.S. Cl. ....................... 717/159; 717/154; 717/152; 717/140; 717/150
(58) Field of Search ................................ 717/151–161, 717/136, 140, 149–150

(56) References Cited

U.S. PATENT DOCUMENTS

| 5,999,736 | A | | 12/1999 | Gupta et al. | |
|---|---|---|---|---|---|
| 6,044,221 | A | | 3/2000 | Gupta et al. | |
| 6,748,589 | B1 | * | 6/2004 | Johnson et al. | ............. 717/150 |
| 2003/0005422 | A1 | * | 1/2003 | Kosche et al. | ............. 717/154 |

OTHER PUBLICATIONS

Chen–Wu, FastForward: Aggressive Compiler Optimization with Speculative Multi-threaded Support, Dec. 2000,Intel Corporation.*

Wu–Larus, Static Branch Frequency and Program Progile Analysis, Nov. 1994, IEEE/ACM Inter'l Symposium on Microarchitectur Nov. 1994.*

Wu–Chen–Fang, Better Exploration of Rewgion–Level Value Locality with Integrated Comnputation Reuse and Value Prediction, Proceedings of the 27th Annual Inter'l Symposium on Microarchitecture, san Jose, CA, USA Nov. 30–Dec. 2, 1994.*

Calder–Feller–Eustace, Value Profiling and Optimization, Jul. 1998, UCSD Technical Report CS98–592.*

Lowry–Medlock, Object Code Optimization, Jan. 1969, Communications of the ACM.*

Chang–Mahlke–Hwu, Using Profile Information to Assist Classic Code Optimizations, Dec. 1991, John Wiley & Sons, Inc. Softwar—Practice & Experience, vol. 21, Issue 12, pp. 1301–1321.*

Path Profile Guided Partial Dead Code Elimination Using Predication, by Rajiv Gupta, et al., PACT'97, Nov. 11–15, 1997 in San Francisco, California.

(Continued)

*Primary Examiner*—Antony Nguyen-Ba
(74) *Attorney, Agent, or Firm*—Blakely, Sokoloff, Taylor & Zafman LLP

(57) ABSTRACT

The present invention relates to a method, apparatus, and system to optimize frequently executed code and to use compiler transformation and hardware support to handle infrequently executed code. The method includes compiling a computer program. The method further includes improving performance of the computer program by optimizing frequently executed code and using compiler transformation to handle infrequently executed code with hardware support. The method also includes storing temporarily the results produced during execution of a region to improve performance of the computer program. The method additionally includes committing the results produced when the execution of the region is completed successfully.

13 Claims, 4 Drawing Sheets

OTHER PUBLICATIONS

Compiler–Directed Dynamic Computations Reuse: Rationale an Initial Results, by Daniel A. Connors, et al., Department of Electrical and Computer Engineering Center for Reliable And High–Performance Computing, University of Illinois, Urbana, IL 61801, Nov. 1999.

Improving Trace Cache Effectiveness with Branch Promotion and Trace Packing, by Sanjay Jeram Patel, et al., Advanced Computer Architecture Laboratory, Department of Electrical Engineering and Computer Science, The University of Michigan, Ann Arbor, Michigan 48109–2122.

The Superblock: An Effective Technique for VLIW and Superscalar Compilation, by Wen–Mei W. Hwu, et al., Center for Reliable and High–Performance Computing, University of Illinois, Urbana–Champaign, Illinois, 61801.

Replay: A Hardware Framework for Dynamic Program Optimization, by Sanjay J. Patel, et al., Center for Reliable and High–Performance Computing, The University of Illinois at Urbana–Champaign, CRHC Technical Report # CRHC–99–16, Dec. 1999.

* cited by examiner

METHOD, APPARATUS, AND SYSTEM TO OPTIMIZE FREQUENTLY EXECUTED CODE AND TO USE COMPILER TRANSFORMATION AND HARDWARE SUPPORT TO HANDLE INFREQUENTLY EXECUTED CODE

CROSS-REFERENCES TO RELATED APPLICATIONS

This application is related to U.S. patent application Ser. No. 09/965,757 filed on Sep. 28, 2001, entitled "Method, Apparatus, and System to Formulate Regions of Reusable Instructions," and U.S. patent application Ser. No. 09/969,962 filed on Sep. 29, 2001, entitled "Method and Apparatus For Performing Compiler Transformation of Software Code Using Fastforward Regions and value specialization," and assigned to the assignee of the present application.

BACKGROUND (1) Field

The present invention relates to a method, apparatus, and system to optimize frequently executed code and to use compiler transformation and hardware support to handle infrequently executed code.

(2) General Background

Generally, the result of using a one-pass compiler is object code that executes much less efficiently than it might if more effort were expended in its compilation. Therefore, it is desirable to optimize object code or intermediate code that is translated into object code.

In an article entitled "rePlay: A Hardware Framework for Dynamic Program Optimization", CRHC Technical Report Draft, December 1999, by Sanjay J. Patel and Steven S. Lumetta, an optimization technique named "rePlay" is disclosed. However, rePlay relies mainly on hardware to form regions and optimize the regions at runtime. This reliance on hardware can be unrealistic since many optimizations can be complicated and require significant hardware and software compilation time.

Furthermore, other optimization techniques, including partial redundancy elimination (PRE) and partial dead-code elimination (PDE), can sometimes be ineffective and are quite complex to implement. PDE is disclosed in "Path profile guided partial dead code elimination using predication", Parallel Architectures and Compilation Techniques, 1997, by Rajiv Gupta, David E. Benson, and Jesse Z. Fang.

In addition, an optimization technique called "Superblock" is disclosed in "The Superblock: An Effective Technique for VLIW and Superscalar Compilation", The Journal of Supercomputing, Kluwer Academic Publishers, 1993, pp. 229–248, by Wen-mei W. Hwu et al. Data and control flow for optimization and scheduling are generally simplified in a superblock. However, a superblock is still a multiple exit region. Thus the optimization and scheduling need to handle issues such as side exit and speculation.

DETAILED DESCRIPTION

The present invention relates to a method, apparatus, and system to optimize frequently executed code and to use compiler transformation and hardware support to handle infrequently executed code.

Figure 1:
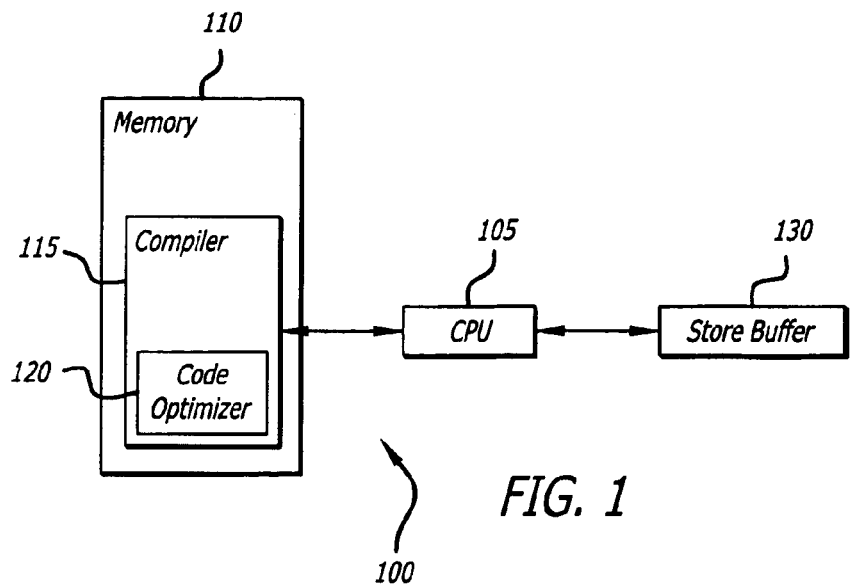
FIG. 1 is a block diagram of an exemplary computing system in accordance with one embodiment of the present invention.

FIG. 1 is a block diagram of an exemplary computing system 100 in accordance with one embodiment of the present invention. Computing system 100 includes a central processing unit (CPU) 105 and memory 110 that is cooperatively connected to the CPU 105. CPU 105 can be used to execute a compiler 115 and a code optimizer 120, which are stored in the memory 110. Compiler 115 is generally used to generate object code from a computer program written in a standard programming language. Compiler 115 includes a code optimizer 120 that is generally used to improve performance of the computer program. The store buffer 130 is cooperatively connected to the CPU 105 to assist the CPU 105 in running or executing the program speculatively.

To optimize code for a sequence of blocks with infrequent side exit branches in accordance with one embodiment of the present invention, the compiler 115 generally duplicates the code to form an initial FastForward region (FFR) and promotes the branch or check instructions in the FFR to ASSERT instructions. Branch promotion generally exploits the high frequency of conditional branches that are strongly biased in one direction. When a strongly biased branch is detected, the branch is promoted into one with a static prediction. Since promoted branches generally require no dynamic prediction, the number of promoted branches allowed on a trace cache line is not limited by the bandwidth of the branch predictor. For more information on branch promotion, please see the article entitled "Improving Trace Cache Effectiveness with Branch Promotion and Trace Packing", In Proceedings of the 25$^{th}$ Annual International Symposium on Computer Architecture, 1998, by Sanjay J. Patel, Marius Evers, and Yale N. Patt.

An ASSERT instruction can either take a predicate of an original branch or the source register of an original check as the operand. An ASSERT instruction typically fires when the predicate becomes false or the source register has a NAT value. As such, the FFR would typically have no side exit. It should be noted that compilers could typically optimize regions with no side exit much more effectively than regions with one or more side exits.

Compiler 115 then inserts a FastForward instruction at the beginning and a commit instruction at the end of the FFR. When the FastForward instruction of the FFR is executed, the address of the original code is saved and the rest of the FFR is executed speculatively. Store buffer 130 temporarily stores the results produced during the execution of a FastForward region. The results in the store buffer 130 are committed when the commit instruction is executed. However if any of the ASSERT instructions in the FFR is fired, execution is rolled back to the original code; and the results in the store buffer 130 are discarded.

Figure 2:
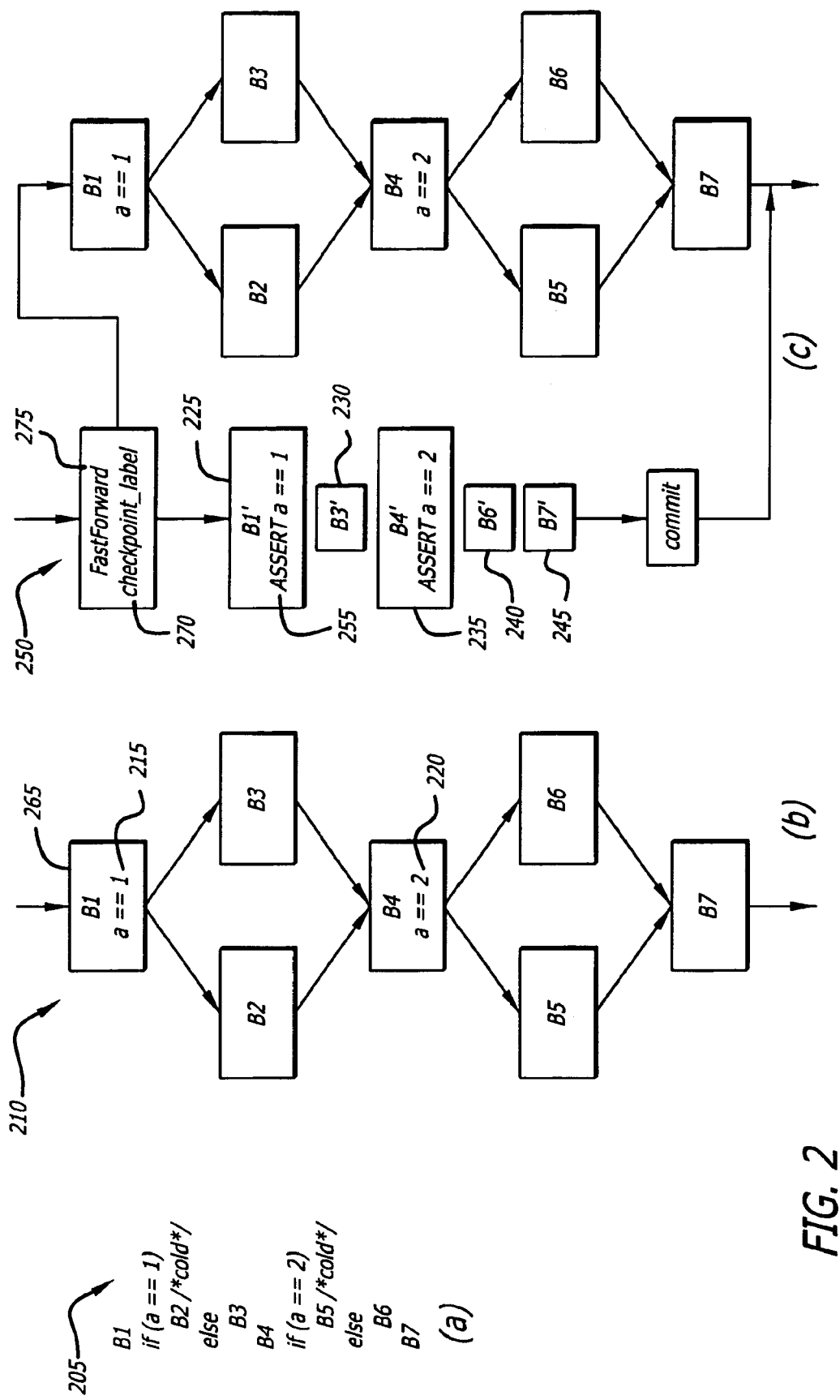
FIG. 2 illustrates the result of a FastForward transformation in accordance with one embodiment of the present invention.

FIG. 2 illustrates the result of a FastForward transformation in accordance with one embodiment of the present invention. A source code sample 205 is shown in (a). Exemplary original control flow graph (CFG) 210 corresponding to the exemplary source code 205 is shown in (b). Original CFG 210 includes two branches, "a==1" 215 and "a==2" 220, that are infrequently taken. As shown in (c), an FFR 250 is formed to include block B1' 225, block B3' 230, block B4' 235, block B6' 240, and block B7' 245. In the FFR, the two branches 215,220 of the original CFG 210 are converted into ASSERT instructions 255,260. Instead of going to block B1 265 of the original CFG 210, control now goes to the FastForward instruction 275 in the FFR 250. The FastForward instruction 275 will record the checkpoint label 270. Checkpoint label 270 is the beginning address of the original code, which is essentially the original code segment. If any of the ASSERT instructions in the FFR fires, the original code will be entered. If the commit instruction at the end of the FFR is reached and executed, the FFR execution has been successfully completed. At this time, the result in the store buffer is updated to the state of the machine.

In performing the FFR transformation, a check instruction will be treated as a branch instruction. It should be noted that the ASSERT for a check instruction would fire on the NAT register value as well. Aside from the successor block connected by the cold edge, each candidate branch has only one successor (referred to as a prevalent successor of the branch). A cold edge is generally a CFG edge with a very low probably of being taken. A candidate branch is generally a conditional branch instruction that has an outgoing edge that is a cold edge.

In addition, each candidate FFR is generally a single entry, single exit region after all the cold edges are removed. A candidate FFR can have internal branches (including loop back branches), candidate branches, or a group of blocks that do not include any function calls and that are connected by unconditional branches. It should be noted that there are many types of code optimizations that are more effective when being applied to single entry, single exit regions than to regions with more complex structures.

Accordingly, the general purpose of constructing or forming FastForward regions is to identify FFR regions having a high completion probability (i.e., a low probability of a side exit occurring), and having good opportunities for optimizations.

Figure 3:
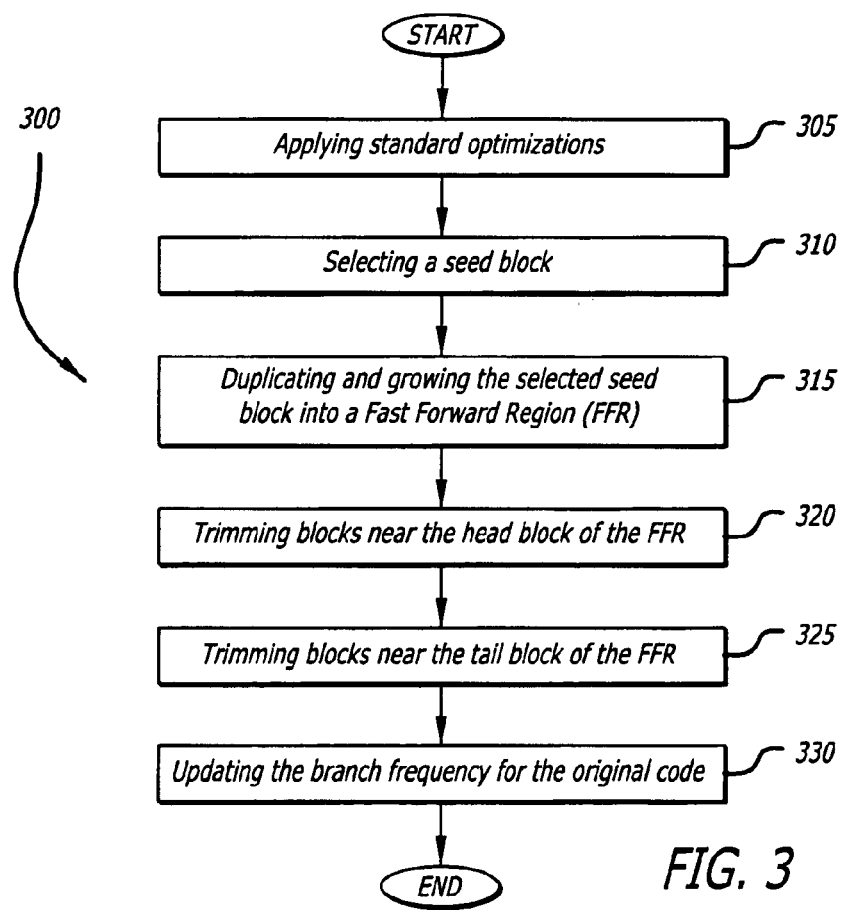
FIG. 3 generally outlines an exemplary process of constructing or forming FastForward regions in accordance with one embodiment of the present invention.

FIG. 3 generally outlines an exemplary process 300 of constructing or forming FastForward regions in accordance with one embodiment of the present invention. In block 305, standard available optimizations (including edge profiling feedback and scheduling) are applied to a function to provide the best baseline code possible, prior to selecting and forming candidate FastForward regions for a function. Baseline code is generally code that does not include any FastForward regions. Furthermore, it should be noted that a FastForward region is selected and formed only if the region can provide an improvement over the baseline code from which the region is derived.

In forming a FastForward region, a seed block for a candidate FFR is first selected (block 310). A typical seed block should be frequently executed, should include a candidate branch instruction, should not be already included in another candidate FFR, and should not have any predecessor blocks that can be selected a seed block. Once it is selected, the seed block is duplicated and expanded or grown into an FFR (block 315). Following the duplication of the seed block, edge frequencies for the duplicated block and the original block are calculated. The duplicated seed block would serve as the initial head block and the initial tail block of the current candidate FFR. After calculating the edge frequencies for the duplicated block, the tail block is examined.

If prevalent successor of the tail block is already in the current FFR, a back edge is being followed. The growth of the current FastForward Region can simply be stopped at the back edge. However for better performance, loop-peeling and unrolling transformations can be used to grow an FFR along the back edges.

For example, if a loop has a small trip count, the loop can be peeled for a few iterations into the current FFR. It should be noted that loop peeling is implied when the region transformation is extended along loop back edges and will not stop until a loop exit block. If the loop has a small and constant number of iterations, the loop can be completely unrolled along the hot path. A smaller edge frequency threshold value can be used to select the back edge since the first several iterations of the loop would more likely be taken than later iterations of the loop. In addition, loop unrolling can be applied when a loop entry is encountered. To unroll a loop, the loop should have a single hot path and a prevalent post-exit block, which is a prevalent successor of the loop by treating the loop as a single node. In one embodiment, the process of loop unrolling can be performed using the logic represented in the following pseudo-code generally describing Unroll_Loop( ).

```
Unroll_Loop(block, Candidate_FFR)
{
    duplicate a completely unrolled loop path into the current
    candidate_FFR;
    return the prevalent post-exit block of the loop;
}
```

After loop unrolling and peeling, the edge frequency for the duplicated blocks is updated, and a new tail block for the FFR is selected to continue the growth of the FFR.

If the prevalent successor is not already in the FFR, the block is a candidate block to be added to the FFR. For each candidate block, certain operations are performed on the block, including duplicating the block, calculating the edge frequencies of the branch in the duplicated block, and making the duplicated block the new tail of the FFR. New candidate blocks would continue to be added (and the aforementioned operations would be performed on the newly added candidate blocks) until no additional blocks can be added to the FFR, or until the completion probability is lower than the threshold.

Once the growth of the FFR is stopped, the FFR can be trimmed by removing blocks near the head block or the tail block of the FFR (blocks 320–325). To trim a block near the head block of the FFR, each of the candidate branches is considered. The branch nearest to the head block would be considered first. For each candidate branch considered, a region is formed by adding the block containing the candidate branch to the tail of the FFR. Once the region is formed, optimization and scheduling are applied to the region. During the application of the optimization and scheduling to the region, all candidate branches in the region are treaded as ASSERTs. After optimization and scheduling are applied to the region, the average number of cycles (denoted T1) for the current FFR is computed. Also, the average number of cycles (denoted T) for the corresponding code in the original program is computed.

In one embodiment, the computation of T1 and T can be performed using the logic represented in the following pseudo-code generally describing Compute_FFR_Cycles( ).

```
Compute_FFR_Cycles(list of block)
{
    N = entry frequency of FFR;
    T1 = T = 0;
    completion_prob = 1;
    R = overhead for the ASSERT to fire and branch to the original code
    for each ASSERT or candidate branch instruction in FFR
    begin
        t = cycles in blocks from head of FFR to the ASSERT or branch
            instruction;
        d = cycles in blocks from head of original code to corresponding
            branch;
        K = firing frequency of the ASSERT (or branch frequency of the
            candidate branch);
        p = K/N;
        completion_prob -= p;
        T1 += (t + R + d) * p;
        T += d * p
    end;
    ffr_commit_cycle = cycles from head to end of FFR;
    recovery_exit_cycle = cycles from head to end of the original code
        corresponding to the FFR;
    T1 += ffr_commit_cycle * completion_prob;
    T += recovery_exit_cycle * completion_prob;
    return (T1, T);
}
```

After T1 and T are computed, the benefit value of the candidate branch can then be calculated and saved. The benefit value of the candidate branch is essentially T minus T1 (T−T1). After all candidate branches are considered, the candidate branch with the best benefit can be identified. Furthermore, all blocks between the head block to the block before the identified candidate branch can be discarded. However, if every benefit value of every candidate branch were not positive, the entire FFR would be discarded.

To trim blocks near the tail of the FFR, a similar process is adopted. The trimming of blocks near the tail of the FFR is shown in block 325 of FIG. 3. For each candidate branch in the FFR, a region is formed from the head block to the prevalent successor of the candidate branch. After the region is formed, optimization and scheduling are applied to the region. During the application of optimization and scheduling to the region, all candidate branches in the region are treated as ASSERTS. After optimization and scheduling are applied to the region, the average number of cycles (denoted T1) for the current FFR is computed. Also, the average number of cycles (denoted T) for the corresponding code in the original program is computed.

After T1 and T are computed, the benefit value of the candidate branch can then be calculated and saved. The benefit value of the candidate branch is essentially T minus T1 (T−T1). After all candidate branches are considered, the candidate branch with the best benefit can be identified. Furthermore, all blocks after the prevalent successor of the candidate branch can be discarded. However, if every benefit value of every candidate branch were not positive, the entire FFR would be discarded.

It should be noted that the blocks that are removed during the trimming of blocks near the head or tail of the FFR will be considered during the formation or construction of other FFR's.

During FFR formation or construction, the branch frequency needs to be updated for the original code to reflect the fact that some of the execution of the branches has been moved to the FFR (block 330). This branch frequency update is also needed during the repeated duplication of the same block into a candidate FFR. However, the edge frequency of the original program should not be permanently changed during the formation or construction of the candidate FFR since the FFR may be trimmed or discarded at a later time. Therefore, the branch frequency for the original code is temporarily updated in a temporary area. After an FFR is finalized, the branch frequency for the original code needs to be permanently updated.

To update the branch frequency for the original code, the block frequency taken by blocks in the FFR is the subtracted or deducted from the block frequency in the original code. It should be noted that when an ASSERT fires, the blocks from the head to the branch in the FFR and the original code will both be executed. Therefore, the duplicated execution in the frequency must be considered and included. With the new block frequency information, branch frequency information can be updated. In one embodiment, the update block frequency can be computed using the logic represented in the following pseudo-code generally describing Update_Freq_Prob( ), where block_freq[b] is the block frequency of block b, and edge_prob[$b_1$, $b_2$] is the branch probability on the edge from $b_1$ to $b_2$.

```
Update_Freq_Prob(Candidate_FFR)
{ E= entry frequency;
    C= commit frequency;
    Candidate_FFR = ($b_1$, $b_2$, . . . , $b_n$) whose corresponding original
        blocks are ($a_1$, $a_2$, . . . , $a_n$);
    for each block $b_i$, i=1, . . . n, in Candidate_FFR
    begin
        find the corresponding recovery block ($a_i$) in original code;
        block_freq[$b_i$] =
        E * edge_prob[$a_1$, $a_2$] * . . . * edge_prob[$a_{i-1}$, $a_i$];
        // the original block needs to take ASSER frequency into
        consideration
        block_freq[$a_i$] = block_freq[$a_i$] − C
    end;
    for each block $b_i$, i=1, . . . n−1, in Candidate_FFR
    begin
        for each successor s of bi
            edge_prob[$b_i$, s] = block_freq[s] / block_freq[$b_i$]
    end;
    for each recovery block $a_i$, i=1, . . . n−1, in Candidate_FFR
    begin
        for each successor s of ai
            edge_prob[$a_i$, s] = block_freq[s] / block_freq[$a_i$]
    end;
}
```

Figure 4:
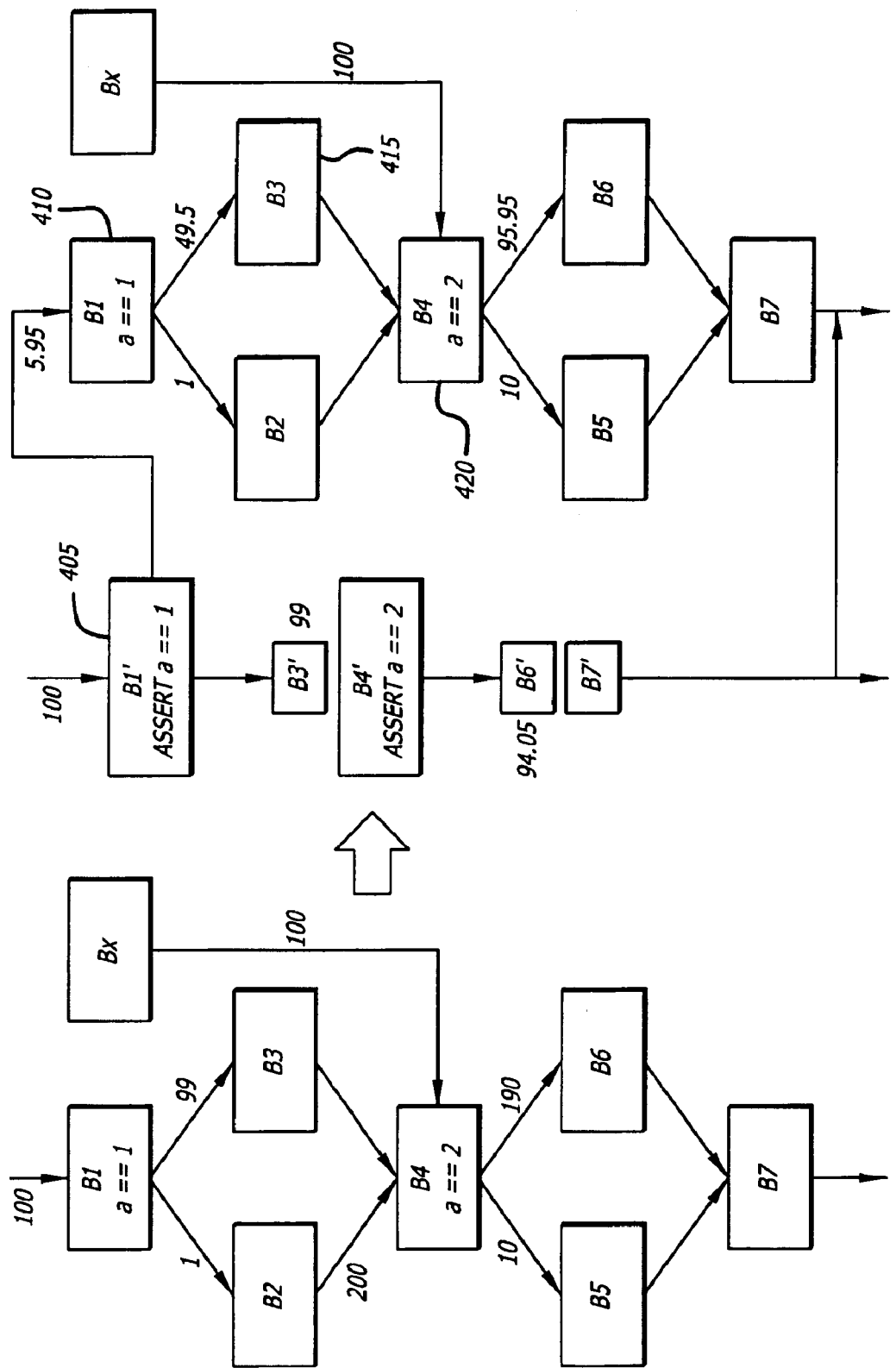
FIG. 4 shows an example of updating the branch frequency.

FIG. 4 shows an example of updating the branch frequency. Initially, B1' 405 has frequency of 100. The probability of ASSERT a==1 is $\frac{1}{100}$; and the number of ASSERT in B1' is 1. Therefore, 1 is added back to B1. The ASSERT probability for ASSERT a==2 is $\frac{10}{200}$. Thus the ASSERT frequency is 4.95 (i.e., 99×0.95), which will be added back to B1 410, B3 415, and B4 420. Also, the FFR has an entry frequency of 100 and a commit frequency of 94.05. As a result, the block will have the correct frequency with ASSERT overhead taken into account and be possibly incorporated into multiple FastForward regions.

In one embodiment, the process of identifying a candidate FFR can be performed using the logic represented in the following pseudo-code generally describing Construct_FFR( ), which invokes Compute_Benefit( ), Update_Freq_Prob( ), and Loop_Unrolling_Satisfied( ), where tmp_freq is an array for storing block frequency information temporarily.

```
Construct_FFR (block, Candidate_FFR)
{
    Queue = all the hot blocks with a candidate branch and without a predecessor with a candidate branch;
    while (block = DeQueue(Queue))
    {   tmp_freq[ ] = copy of all block frequency of the function;
        Candidate_FFR = new_FFR( );
        duplicate_blk = duplicated block of the original block;
        tmp_freq[duplicate_blk] = tmp_freq[block];
        Add block to Candidate_FFR;
        tmp_freq[block] = 0 //initially for a seed block
        //determining prevalent successor using the tmp_freq[ ] information
        while (block has a prevalent successor succ_blk)
        {
            if (succ_blk is in another Candidate_FFR)
                break;
            if (Loop_Unrolling_Satisfied(succ_blk)
                succ_blk = Unroll_Loop(succ_blk, Candidate_FFR)
            else begin
                duplicate_succ = duplicated succ_blk;
                    //computing block frequency
                tmp_freq[duplicated_succ] = tmp_freq[duplicate_blk] * edge_prob[block, succ_blk];
                tmp_freq[succ_blk] = tmp_freq[succ_blk] – tmp_freq[duplicated_succ]
            end;
            block = succ_blk;
        }//while (block has a prevalent successor succ_blk)
    }//while (block = DeQueue(Queue))
L1:
    //Trimming near the beginning
    main_head = head of Candidate_FFR
    best_head = NULL;
    best_benefit = 0;
    for each candidate branch from the one nearest to the head block of Candidate_FFR
    begin
        blk = the block containing the candidate branch;
L2:     benefit = Compute_Benefit(blocks from blk to end of the Candidate_FFR);
        if (benefit > best_benefit) begin
            best_head = blk;
            best_benefit = benefit;
        end;
    end;
    if (best_benefit <= 0) begin
        EnQueue(head->prevalent_successor, Queue);
        remove Candidate_FFR
        continue;
    end;
    if (best_head != main_head) begin
        new_seed = main_head;
        remove blocks from main_head to the block before the best_head from FFR;
        Candidate_FFR->head = best_head;
        if (new_seed has a candidate branch)
            EnQueue (new_seed, Queue)
    end;
    //Trimming near the end
    best_tail = NULL;
    best_benefit = 0;
    for each candidate branch of Candidate_FFR
    begin
        succ_blk = the prevalent successor of the candidate branch;
L3:     benefit = Compute_Benefit (blocks from head to succ_blk);
        if (benefit > best_benefit) begin
            best_tail = succ_blk
            best_benefit = benefit;
        end;
    end;
    if (best_benefit <= 0) begin
        EnQueue(head->prevalent_successor, Queue);
        remove Candidate_FFR;
        continue;
    end;
    if (best_tail != tail of FFR) begin
        new_seed = prevalent successor of best_tail;
        remove blocks from new_seed to the tail of Candidate_FFR;
        Candidate_FFR->tail = best_tail;
        if (new_seed has a candidate branch)
            EnQueue (new_seed, Queue)
    end;
    //Update block frequency and edge probability for the finalized FFR and corresponding recovery code
    Update_Freq_Prob(Candidate_FFR);
    for each candidate branch in Candidate_FFR
```

```
    begin
        convert the candidate branch to an ASSERT;
    end;
    create fastforward and commit instructions and connect Candidate_FFR to original code;
} //end of Construct_FFR( )
Compute_Benefit (list of blocks)
{
    treat the list of block as a region;
    treat all branches as asserts;
    schedule and optimize the region;
    identify the corresponding original_region;
    (T1, T) = Compute_FFR_Cycles(region, original_region);
    return (T-T1);
} //end of Compute_Benefit( )
Loop_Unrolling_Satisfied(block)
{
    if (block is a loop entry
        && block->loop has a small, fixed number of iterations and small hot path loop body
        && block->loop has a prevalent successor block)
            return TRUE;
    else return FALSE;
} //end of Loop_Unrolling_Satisfied( )
```

It should be noted that the above pseudo-code generally describing Construct_FFR( ) includes labels L1, L2, and L3. The reason for including these labels will be more apparent as will be shown below.

As shown above, optimizations and scheduling of a sub-FFR are repeatedly performed to determine the benefit for identifying the best FFR. The repeated optimization and scheduling is needed since the trimming of any block will significantly affect the schedule of the remaining region. However, the repeated optimization and scheduling will also increase the compilation time. Therefore, an alternative region formation technique could be employed to trade off the compilation time and the optimality of the resulting FFR. In the alternative technique to construct or form FFR regions, the optimization and scheduling of each candidate FFR is performed only once.

In the alternative technique to construct or form FFR regions where the optimization and scheduling of each candidate FFR is performed only once, the region-based optimization and scheduling is applied to the whole candidate FFR before trimming any blocks. For each candidate branch in the FFR, a region is formed from the head block to the prevalent successor of the candidate branch. After that, the average number of cycles (denoted T1) for the current FFR is computed. Also, the average number of cycles (denoted T) for the corresponding code in the original program is computed. In one embodiment, the computation of T1 and T can be performed using the logic represented in the pseudo-code generally describing Compute_FFR_Cycles( ). After T1 and T are computed the benefit value of the candidate branch can then be calculated and saved. The benefit value of the candidate branch is essentially T minus T1 (T-T1).

To trim blocks near the head block of the FFR, each of the candidate branches from the block nearest to the head block is considered. The candidate branch with the best benefit value is identified. Then, all blocks from the head block to the predecessor block of the identified candidate branch are discarded. If no candidate branch has a positive benefit value, the entire FFR will be discarded.

To trim blocks near the tail of the FFR, the candidate branch with the best benefit value is identified. Then, all blocks after the prevalent successor of the identified candidate branch are discarded. If no candidate branch has a positive benefit value, the entire FFR will be discarded.

In one embodiment, the alternative region construction or formation technique, in which the optimization and scheduling of each candidate FFR is performed only once, can be performed using logic similar to the above pseudo-code generally describing Construct_FFR( ) with modifications at labels L1, L2, and L3 as follows:

A statement to schedule and optimize the Candidate_FFR should be added at label L1.

The statement at label L2 should be replaced with the following pseudo-code:

```
benefit=Compute_Simple_Benefit(blocks from head to succ_blk)
```

The statement at label L3 should be replaced with the following pseudo-code:

```
benefit=Compute_Simple_Benefit(blocks from head to succ_blk)
```

In one embodiment, the logic of Compute_Simple_Benefit( ) can be generally described in the following pseudo-code:

```
Compute_Simple_Benefit(list of blocks)
{
    treat the list of block as a region;
    treat all branches as asserts;
    identify the corresponding original_region;
    (T1, T) = Compute_FFR_Cycles (region, original_region);
    return (T-T1);
} //end of Compute_Simple_Benefit( )
```

After a candidate FFR is constructed or formed, candidate branches are converted to ASSERT instructions. However if a candidate branch has both of its successors inside the same FFR, the candidate branch will not be converted to an ASSERT instruction. Furthermore, the original code corresponding to the candidate FFR is connected with FastForward and commit instructions in the candidate FFR.

Next, optimizations and instruction scheduling are performed to the whole function. The optimizations and instruction scheduling should keep the semantics of the FFR the same as its corresponding original code. One simple method is to keep the semantics of each FFR unchanged. For example, optimizations that may change the semantics of the FFR (e.g., code hoisting) should first be applied to the inside of the candidate FFR; and each region should then be treated as an atomic operation when optimizations are applied globally. It should be noted that many global optimizations, such as copy propagation, dead code elimination, etc. do not change the semantics of the FFR so they can be applied across FFR boundaries.

Figure 5:
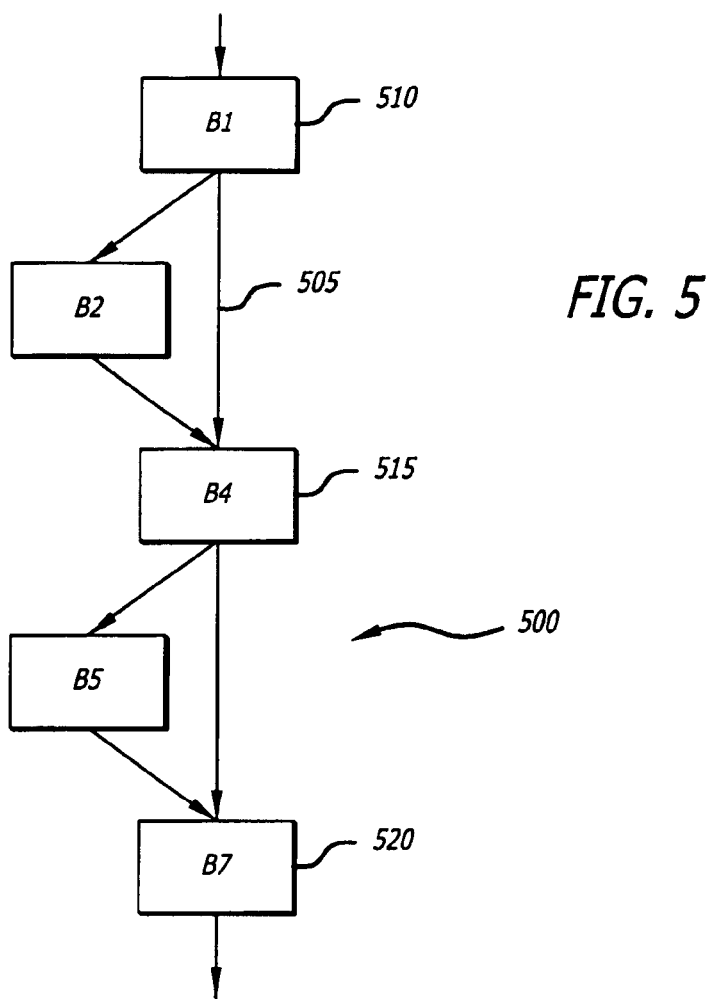
FIG. 5 shows an example of an FFR with multiple paths.

It should be noted that the aforementioned techniques to form regions could construct FastForward regions with multiple paths. FIG. 5 shows an example of a multi-path FFR 500. In the figure, the edge B1->B4 505 is included in the FFR 500 as both successors of B1 510 are in the same FFR 500.

Figure 6:
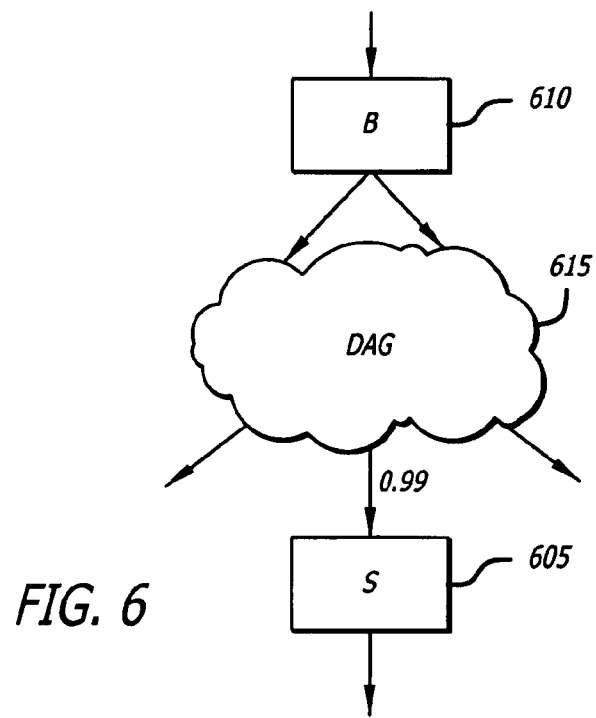
FIG. 6 shows an example of a general prevalent successor.

Furthermore, the aforementioned techniques to form or construct regions could be extended to allow more general multiple-path FFR by extending the concept of prevalent successors. FIG. 6 shows an example of a general prevalent successor. The prevalent successor S 605 of a block B 610 is a block that B 610 reaches with a high probability, possibly going through a Directed Acyclic Graph (DAG) 615. It should be noted that no block between B and S can be a prevalent successor of B. A special case of prevalent successor is when B reaches S directly. In FIG. 5, block B1 510 reaches block B4 515 and block B7 520 with a probability of 1.0; however, only block B4 515 is the prevalent successor of block B1 510.

With the generalized concept of prevalent successor, the region formation algorithm can be used to form general DAG FastForward regions. It should be noted that the FFR should still be a single entry and single exit region. Any branch in the FFR that jumps to the outside of the FFR will be converted to an ASSERT.

The FastForward technique can be applied in a single-threaded or multi-threaded execution models. The techniques presented earlier are based on a single-threaded model. The original code generally does not need to be executed most of the time if the FFR execution is committed successfully. In addition, the probability of hitting an ASSERT is low. Once an ASSERT is fired, the original code will be started from the beginning, and the result of the FFR execution in the hardware store buffer will be discarded.

In a multi-threaded model, both the original code and FFR will be executed simultaneously. FastForward region is executed speculatively. If none of the ASSERT instructions inside the FFR were fired, the speculative thread may commit and act as a main thread, assuming that FFR is highly optimized and will finish earlier. If any of the ASSERT instructions fires, the speculative thread dies and the main thread just continues. It is not necessary to start the original code after hitting an ASSERT. Therefore, the execution time of recovery overhead is almost none as the original code started simultaneously. On the other hand, the hardware support on multi-threading synchronization may require more complicated design than the single-threaded FastForward store buffering.

It should be noted that functional components, as shown in the figures and described above in the text accompanying the figures, could be implemented using software code segments. If the aforementioned functional components are implemented using software code segments, these code segments can be stored on a machine-readable medium, such as floppy disk, hard drive, CD-ROM, DVD, tape, memory, or any storage device that is accessible by a computing machine.

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system comprising:
a compiler to compile a computer program, the compiler forming optimized code regions to improve performance of the computer program by selecting a seed block, duplicating the seed block, and growing the seed block to form a region, and by trimming blocks near a head block of the region to form a trimmed region having improved scheduling cycles;
a memory to store the compiler;
a central processing unit (CPU) cooperatively connected to the memory to run the compiler and to speculatively execute the optimized code regions; and
a store buffer connected to the CPU to improve the speed at which the CPU speculatively executes the optimized code regions.

2. The system of claim 1, wherein the store buffer assists the CPU in speculatively executing the optimized code regions by temporarily storing results produced during the speculative execution of the optimized code regions.

3. The system of claim 1, wherein the compiler improves performance of the computer program by applying standard available optimizations.

4. The system of claim 1, wherein the compiler improves performance of the computer program by trimming blocks near a tail block of the region to form a trimmed region having improved scheduling cycles.

5. The system of claim 1, wherein the compiler improves performance of the computer program by updating a branch frequency for an original code corresponding to the region to form an improved region.

6. A computer system implemented method comprising:
compiling a computer program;
improving performance of the computer program further by (i) selecting a seed block, duplicating the seed block, and growing the seed block to form a region, and (ii) trimming blocks near a head block of the region to form a trimmed region of having improved scheduling cycles;
storing temporarily the results produced during execution of formed regions to handle infrequent code being actually executed; and
committing the results produced when the execution of the region is completed successfully.

7. The method of claim 6, wherein the improving performance of the computer program further includes applying standard available optimizations to the formed regions.

8. The method of claim 6, wherein the improving performance of the computer program further includes trimming blocks near a tail block of the region to form a trimmed region having improved scheduling cycles.

9. The method of claim 10, wherein the improving performance of the computer program further includes updating a branch frequency for an original code corresponding to the region to construct an improved region.

10. A machine-readable medium comprising instructions which, when executed by a machine, cause the machine to perform operations comprising:
compiling a computer program;
improving performance of the computer program by (i) selecting a seed block, duplicating the seed block, and growing the seed block to form a region, and trimming blocks near a tail block of the region;
storing temporarily the results produced during execution of a region to improve performance of the computer program; and
committing the results produced when the execution of the region is completed successfully.

11. The machine-readable medium of claim 10, wherein the improving performance of the computer program further includes applying standard available optimizations.

12. The machine-readable medium of claim 10, wherein the improving performance of the computer program further includes trimming blocks near a head block of the region.

13. The machine-readable medium of claim 10, wherein the improving performance of the computer program further includes updating a branch frequency for a original code corresponding the region.

* * * * *